No. 733,076. PATENTED JULY 7, 1903.
C. G. NYE & F. E. JENKINS.
POWER TRANSMISSION GEARING.
APPLICATION FILED JAN. 10, 1903.
NO MODEL. 3 SHEETS—SHEET 1.

Witnesses
Benj. Finckel
Saml. S. Maughlin

Inventors
Clarence G. Nye
and
Frank E. Jenkins
by Finckel & Finckel
their Attorneys No. 733,076. PATENTED JULY 7, 1903.
C. G. NYE & F. E. JENKINS.
POWER TRANSMISSION GEARING.
APPLICATION FILED JAN. 10, 1903.
NO MODEL. 3 SHEETS—SHEET 2.
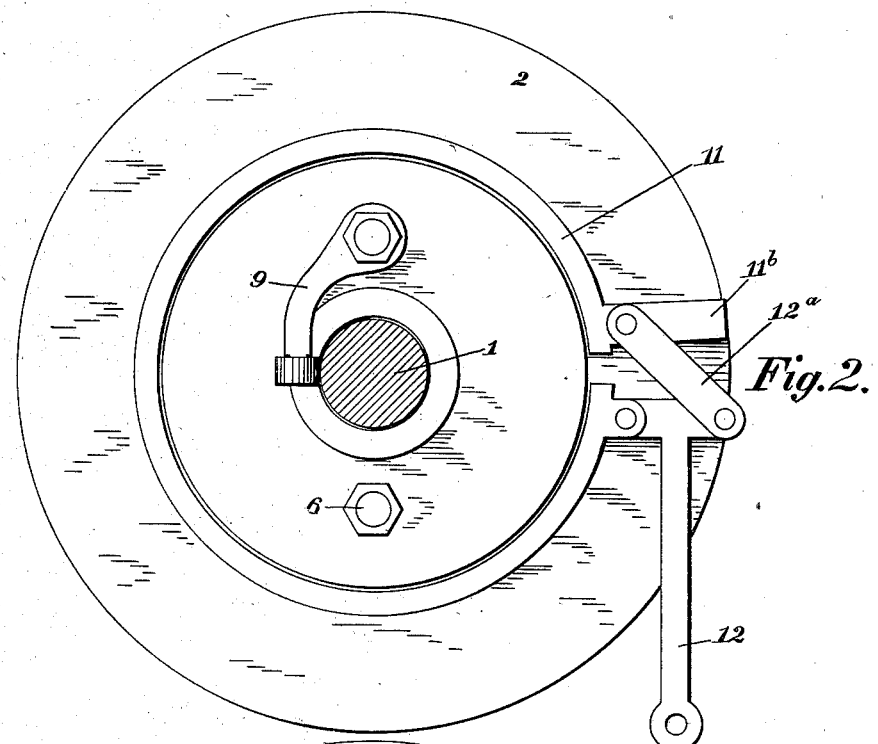
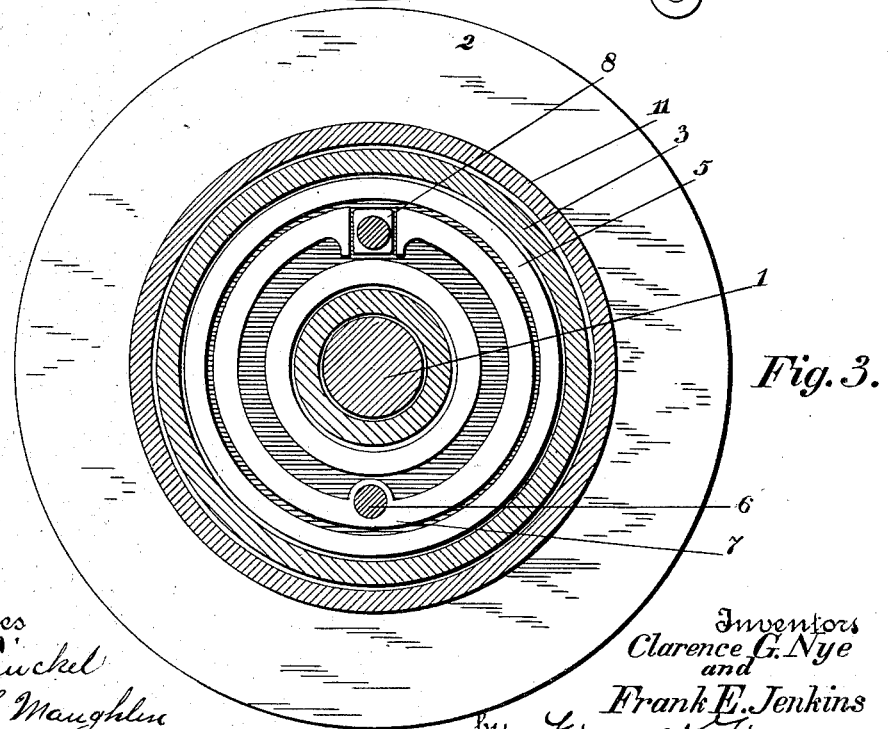
Witnesses
Benj Finckel
Saml S. Maughlin
Inventors
Clarence G. Nye
and
Frank E. Jenkins
by Finckel & Finckel
their Attorneys No. 733,076. PATENTED JULY 7, 1903.
C. G. NYE & F. E. JENKINS.
POWER TRANSMISSION GEARING.
APPLICATION FILED JAN. 10, 1903.
NO MODEL. 3 SHEETS—SHEET 3.

Witnesses
Benj. Finckel
Saml S. Maughlin

Inventors
Clarence G. Nye
and
Frank E. Jenkins
by Finckel & Finckel
Their Attorneys No. 733,076. Patented July 7, 1903.

UNITED STATES PATENT OFFICE.

CLARENCE G. NYE AND FRANK E. JENKINS, OF COLUMBUS, OHIO.

POWER-TRANSMISSION GEARING.

SPECIFICATION forming part of Letters Patent No. 733,076, dated July 7, 1903.

Application filed January 10, 1903. Serial No. 138,537. (No model.)

*To all whom it may concern:*

Be it known that we, CLARENCE G. NYE and FRANK E. JENKINS, citizens of the United States, residing at Columbus, in the county of Franklin and State of Ohio, have invented certain new and useful Improvements in Power-Transmission Gearing; and we do hereby declare the following to be a full, clear, and exact description of the invention, such as will enable others skilled in the art to which it appertains to make and use the same.

The object of this invention is to provide a simplified gearing for the transmission of power in either of two directions from a shaft rotated in one direction.

The invention is particularly useful in motor-vehicles which are to be moved either forward or backward; but the invention is not by any means limited to this use.

The invention consists in the improved construction hereinafter described and claimed.

Figure 1:
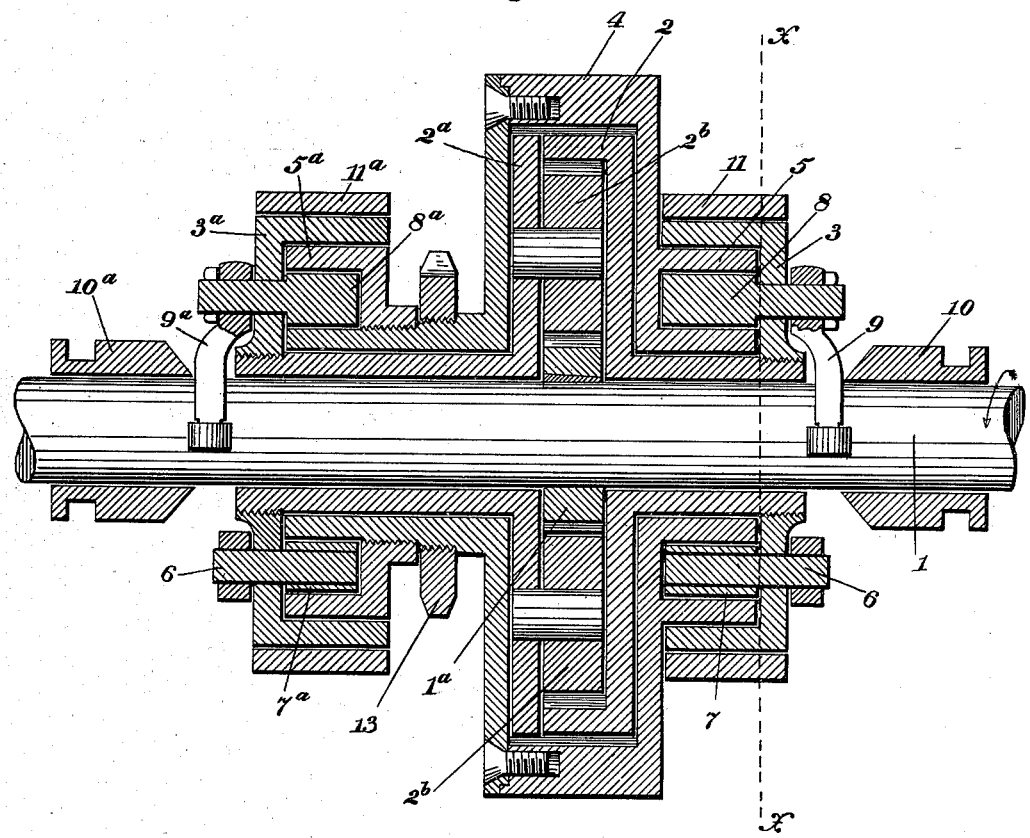
Figure 4:
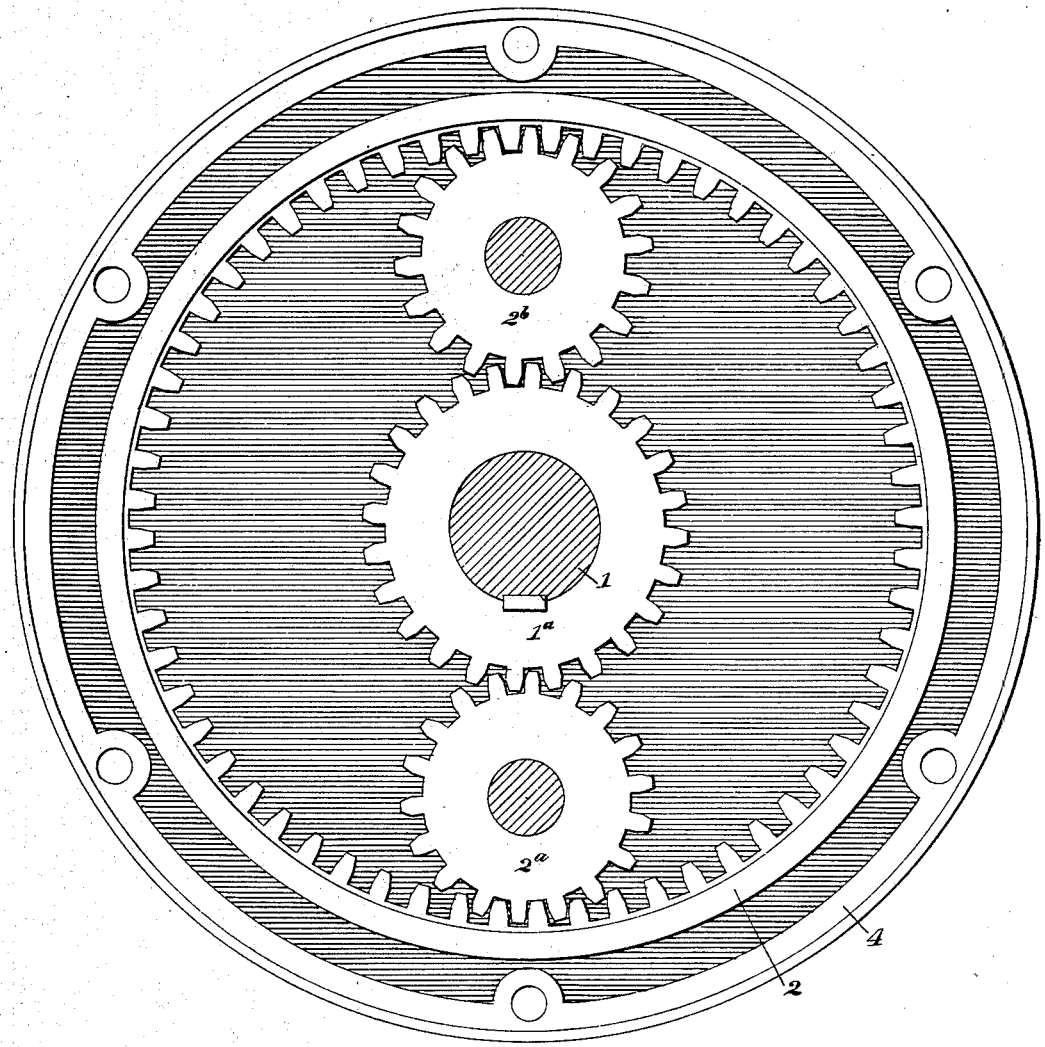

In the accompanying drawings, Figure 1 is a central sectional view, a few parts being in full. Fig. 2 is an elevation looking at the right-hand side of Fig. 1. Fig. 3 is a sectional view on the line $x\,x$, Fig. 1, looking toward the left of Fig. 1. Fig. 4 is an enlarged view of the interior of the gearing, the main shaft and pinion-shafts being in section.

In the several views, 1 designates the power-shaft, which is to be driven in one direction. The shaft 1 has keyed to it a spur-gear $1^a$. Turning loosely on the shaft 1, on one side of the spur-gear $1^a$, is an internally-toothed flanged disk or part 2, and on the opposite side a disk $2^a$, carrying journaled pinions $2^b$. The pinions $2^b$ mesh with the internally-toothed part 2 and with the gear $1^a$. The sleeve of the part 2 and the sleeve of the disk $2^a$ have threaded to their ends disks 3 and $3^a$, formed with circumferential rims.

4 designates an outer casing inclosing the parts 2 and $2^a$ and having at opposite sides thereof flanges 5 and $5^a$. Supported within the flanges 5 and $5^a$ on pins 6 and $6^a$, secured in the disks 3 and $3^a$, are split friction-rings 7 and $7^a$. Working between the free ends of the friction-rings 7 and $7^a$ are wedges 8 and $8^a$, having shanks journaled in and protruding through the disks 3 and $3^a$. Secured to the outer ends of the shanks of the wedges 8 and $8^a$ are arms 9 and $9^a$, the free ends of which are furnished with antifriction-rollers. On the shaft 1 are wedging clutching-collars 10 and $10^a$, adapted when forced inward under the arms 9 and $9^a$ to turn the wedges 8 and $8^a$ on their axes, and therefore spread asunder the free ends of the friction-rings 7 and $7^a$, which are thus bound or clutched against the inner sides of the flanges 5 and $5^a$. On the outer sides of the rims of the disks 3 and $3^a$ are clutching-straps 11 and $11^a$. As seen in Fig. 2, these clutching-straps are split rings, one end of each of which has a suitable projection $11^b$ to be fixed in the frame of the vehicle or machine, while the other end has hung to it a lever 12, connected by a link $12^a$ with the fixed end of the clutch-strap. By forcing inward the lever 12 the strap can be tightened against the rim of the disk that it encircles.

In practice means will be provided which, moved in one direction, will simultaneously operate the clutch 10 and strap $11^a$ and, moved in the opposite direction, will simultaneously operate the clutch $10^a$ and strap 11, the intermediate position being such that the straps and clutching devices are free. We have not shown this means, because its provision is within the domain of the skilled mechanic and is not of our invention.

The outer casing can be provided with a sprocket-wheel 13 or other device for transmitting the power to the object to be operated.

The operation is as follows: Let it be supposed that the shaft 1 is running in the direction indicated by the arrow at the right-hand side of Fig. 1 and the other parts loose. If the collar 10 be moved inward and the clutch 7 clamped against the rim 5 and the strap $11^a$ clamped, the outer casing 4 will be carried in the direction opposite that of the shaft, because the disk $2^a$ will be held stationary. If, on the contrary, the clutch 7 and strap $11^a$ be released and the collar $10^a$ be moved inward and the clutch $7^a$ clamped against the flange $5^a$ and the strap 11 clamped against the rim of the part 3, the part 2 will be held stationary and the outer casing 4 carried in the direction of the shaft, because the strap $7^a$ binds the casing 4 to the moving disk $2^a$.

What we claim, and desire to secure by Letters Patent, is—

1. In a power-transmitting gearing, the combination of a shaft, a spur-gear thereon, an internally-toothed part on said shaft having a friction-rim, a friction-strap therefor, a disk on said shaft, a pinion on said disk meshing both with the aforesaid spur-gear and the internally-toothed part, said disk also having a friction-rim, a strap therefor, an outer casing having friction-flanges, spring-clutches to engage said flanges and means for operating said clutches and friction-straps.

2. In a power-transmission gearing, the combination of a shaft, a spur-gear thereon, an internally-toothed part on said shaft, a friction device to engage said internally-toothed part, a disk on said shaft, a pinion on said disk meshing both with the aforesaid spur-gear and internally-toothed part, a friction device to engage said disk, an outer casing inclosing the aforesaid internally-toothed part and disk, and means carried by said disk and internally-toothed part for engaging the outer casing.

In testimony whereof we affix our signatures in presence of the same two witnesses.

CLARENCE G. NYE.
FRANK E. JENKINS.

Witnesses:
C. J. HUTSON,
GEO. M. FINCKEL.